United States Patent [19]
Shau et al.

[11] Patent Number: 5,393,970
[45] Date of Patent: Feb. 28, 1995

[54] OPTICAL LOCATION TRACKING DEVICES

[75] Inventors: Jeng-Ge Shau, Taipei, Taiwan; Jeng-Jyesham, 991 Amarillo Ave. Palo Alto, CA 94303.

[73] Assignee: Jeng-Jye Shau, Palo Alto, Calif.

[21] Appl. No.: 119,537

[22] Filed: Sep. 13, 1993

[51] Int. Cl.[6] .................... G01J 1/20; G01S 3/784
[52] U.S. Cl. .................... 250/206.2; 250/203.4; 250/203.6; 250/206.1
[58] Field of Search .......... 250/203.4, 203.6, 206.1, 250/206.2; 356/141, 152

[56] References Cited

U.S. PATENT DOCUMENTS

| | | | |
|---|---|---|---|
| 3,268,185 | 8/1966 | Eckermann, Jr. | 250/203.6 |
| 4,225,781 | 9/1980 | Hammons | 250/203.4 |
| 4,550,250 | 10/1985 | Mueller et al. | 250/203 |
| 4,558,313 | 12/1985 | Garwin et al. | 340/709 |
| 4,782,328 | 11/1988 | Denlinger | 340/365 |
| 5,159,322 | 10/1992 | Loebner | 340/706 |
| 5,166,668 | 11/1992 | Aoyagi | 340/710 |

FOREIGN PATENT DOCUMENTS 2325504 12/1990 United Kingdom ............ 250/206.1

Primary Examiner—William L. Sikes
Assistant Examiner—Fetsum Abraham

[57] ABSTRACT

A practical location tracking device provides cost-efficient methods for inputting three-dimensional location information. This device comprises light sources and light receiving elements. Each light receiving element comprises two or more closely spaced planar light detectors with their light receiving surfaces facing different spatial directions. Three dimensional location is determined by comparing the relative light intensities detected by those light detectors.

6 Claims, 10 Drawing Sheets

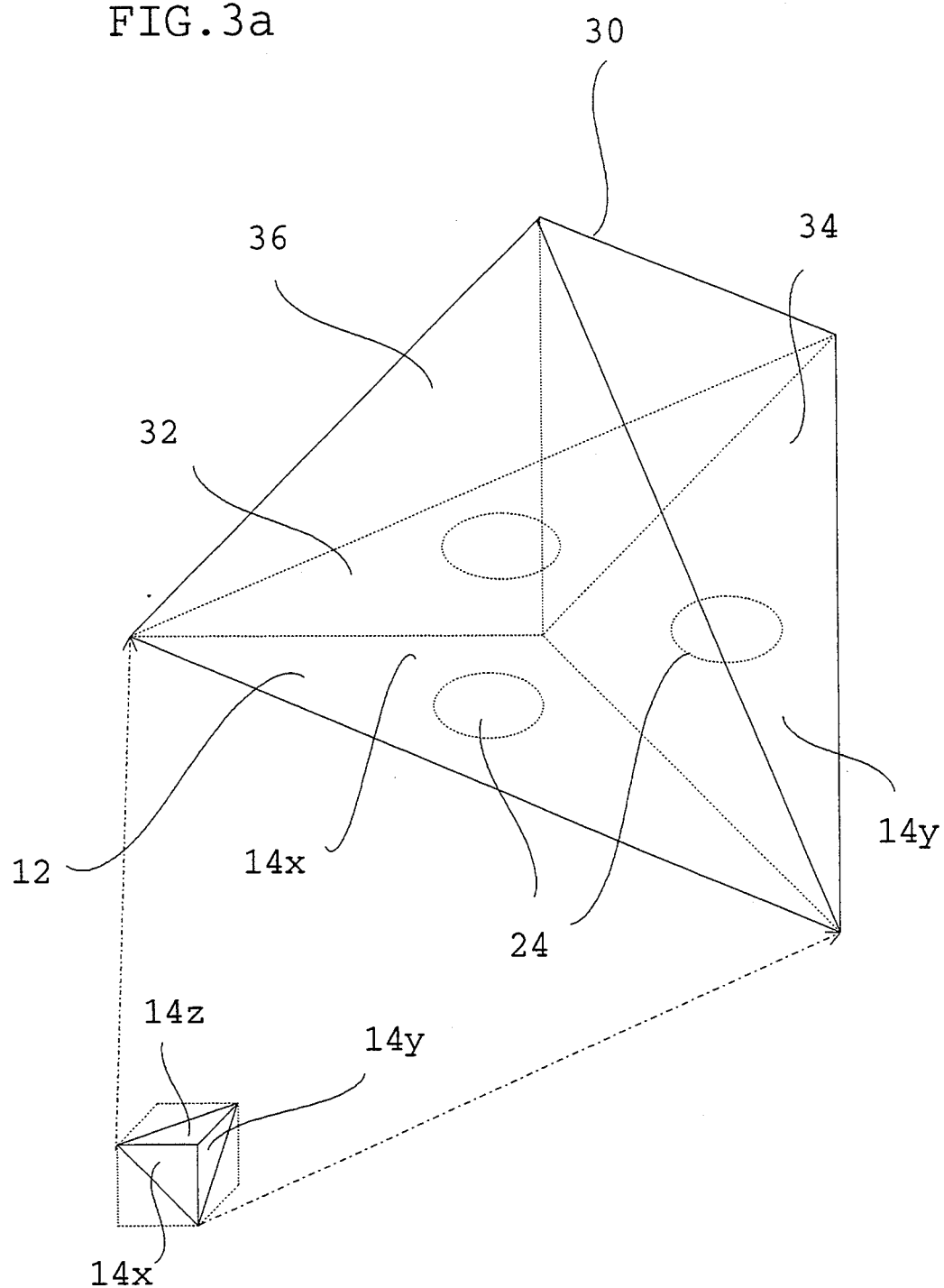

OPTICAL LOCATION TRACKING DEVICES

BACKGROUND OF THE INVENTION

This invention relates to optical location tracking devices. More specifically, this invention relates to devices using optical detectors to determine the locations of light sources.

Heretofore, a variety of optical location tracking devices have been built. U.S. Pat. No. 4,558,313 describes a location indicator using a scanning light beam. The location of an object is detected when the object blocks a scanning light beam. This type location tracking system comprises complex mechanical apparatus to generate a scanning light beam. The input device of the system must locate in a pre-defined narrow region. Any foreign object blocks the scanning light beam by accident will cause false interpretation. Its supporting electrical circuit is also complex. U.S. Pat. No. 5,166,668, U.S. Pat. No. 5,159,322, and U.S. Pat. No. 4,782,328 describe systems using an array of closely spaced optical sensors such as charge coupled devices (CCD) to determine the location of a light source. This type of location tracking systems must use a large number of closely spaced light sensors. A complex system is required to obtain information from a large number of sensors. The data analysis procedure is also complex. Another type of optical tracking devices are the sun tracking devices designed to aim a solar panel to face the sun. Two examples of sun tracking devices are described in U.S. Pat. No. 4,225,781 and U.S. Pat. No. 3,268,185. Those sun tracking devices are able to determine whether the solar panels are off target or not, but they are not able to do accurate location measurement for a point source. U.K. Pat. No. 2,232,550 describes a direction-of-arrival sensor (DOAS) using four mirrors and four sensors to determine the incident angle of a collimated light beam. The DOAS device is fragile because it requires perfect reflectors that are arranged perfectly perpendicular to one another. It won't be able to tolerate dust or mist existed in practical operation conditions. U.S. Pat. No. 4,550,250 describes a location tracking device that only requires a small number of light sensors. The light emitted from a light source is confined by a vertical slit to form a line-shaped bright area. This line-shaped bright area falls on two light sensors with apertures of different shapes. The light incident angle is determined by measuring the ratio of the light intensities detected by those two light sensors. Those two light sensors must have uniform sensitivity at different locations for this device to be accurate. The light intensities in the line-shaped bright area also need to be uniform. Both requirements are not easy to achieve. The slit also limits available range and resolution of the system. All of the above optical location tracking systems are too complex to compete with existing commercial devices in terms of cost to performance considerations. They also tend to have reliability problems. It is desirable to have an optical location tacking device that can be manufactured with a cost-efficient process. It is also desirable to have a device that does not use any delicate component so that it can be reliable at normal operation conditions.

SUMMARY OF THE INVENTION

Accordingly, a primary objective of the present invention is to provide a cost-efficient optical device for inputting positional information.

Another objective of this invention is to provide a reliable location tracking device at practical operation conditions; such a device must avoid using delicate components.

A further objective is to provide a device that can determine the locations of many objects simultaneously.

These objectives are accomplished by an input device that comprises light sources and light receiving elements. Each light receiving element comprises two or more closely spaced planar light detectors with their light receiving surfaces facing different directions. Using the angular dependence of the light detectors, three dimensional location information is determined by comparing the relative light intensity detected by those light detectors. This invention only requires a small number of light sensors while it can achieve better accuracy then all the systems quoted in the previous section. It also has a wide detecting range. The input method is very simple and convenient. The device and its supporting systems are ready to be manufactured with cost-efficient processes.

BRIEF DESCRIPTION OF THE DRAWINGS

The present invention will be described in details with reference to the preferred embodiments illustrated in the accompanying drawings in which:

FIGS. 3a and 3b show another location tracking device;

DESCRIPTION OF THE PREFERRED EMBODIMENT

Figure 1:
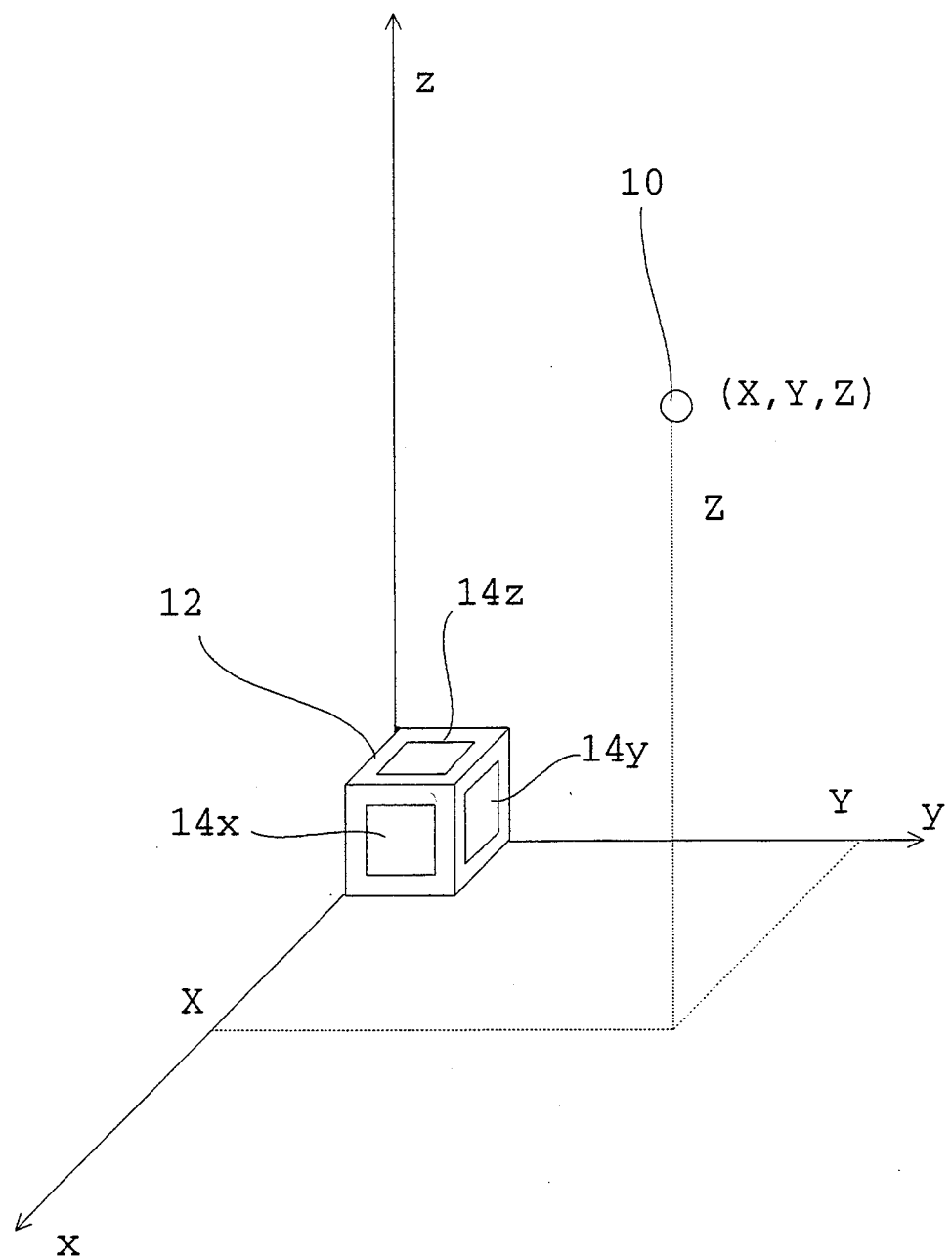
FIG. 1 is a simplified diagram of a three-dimensional location tracking device.

Referring now to FIG. 1, a light source 10 is placed at a distance away from an optical location tracking device 12. The optical location tracking device 12 comprises three planar light receivers 14x, 14y, and 14z. The surfaces of those planar light receivers are oriented vertically to one another. A Cartesian coordinate is defined with its x, y, and z axes perpendicular to the surfaces of the planar light detectors 14x, 14y, and 14z. The location of the light source 10 is described by (X,Y,Z) as shown in FIG. 1.

Figure 2:
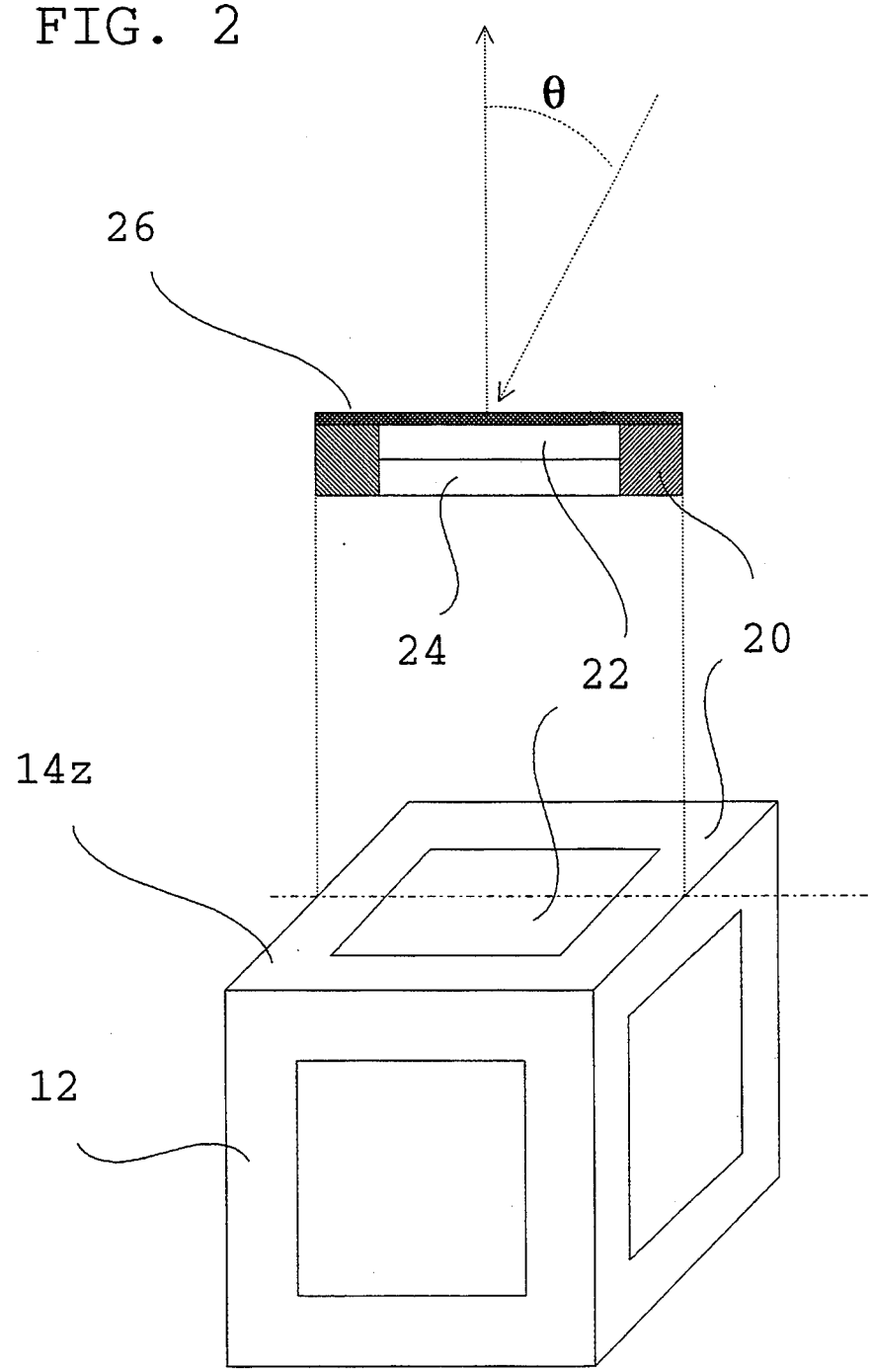
FIG. 2 is a cross-section diagram of a planar light receiver in FIG. 1.

FIG. 2 shows a cross-section diagram of one of the planar light receivers in FIG. 1. This planar light receiver 14z comprises an aperture 22 and a light sensor 24 that is surrounded by light blocking areas 20. The surface of the light receiver is covered with a light diffuser 26 that is made of light scattering materials. The light sensor 24 can be any type of light detecting device known to the art. In our examples we use low cost solar cells as the light sensor.

Referring to FIG. 2, if the angle between the incident light beams and the normal vector of the light receiving plan is Θ, the total light density received at the surface is $$I_i = I_s \cos\Theta \quad (1)$$

where $I_s$ is the in-coming light intensity, and $I_i$ is the received light density. The output of the light sensor $I_o$ should be proportional to $I_i$ as $$I_o = KI_i = KI_s \cos\Theta \quad (2)$$

where K is a proportional constant representing the efficiency of the light sensor. For many kinds of light sensors, K is also a function of the light incident angle Θ. A light sensor that has a complex angular dependence still can be used in this invention to achieve the same purpose as soon as the angular dependence is calibrated. However, the calibration procedure will be more complex if the light sensor does not follow the simple cosΘ dependence. One way to simplify the calibration procedure is to place a diffuser 26 in front of the light sensor. This diffuser 26 scatters the incident light beams so that the light reaching the light sensor is of random incident angle. In this condition, K is no longer dependent on the incident angle Θ, and the signal detected by the light sensor is proportional to cosΘ. To simplify our discussion, we will assume the outputs of the light sensors follow the cosΘ dependence in all of the following examples. It is to be understood that a light detector of a different angular dependence also can serve the same purpose.

Referring back to FIG. 1, Eq. (2) predicts that $$I_x:I_y:I_z = \cos\Theta_x:\cos\Theta_y:\cos\Theta_z \quad (3)$$

where $I_x$, $I_y$, and $I_z$ represent the light intensity detected by planar light receivers 14x, 14y, and 14z; $\Theta_x$, $\Theta_y$, and $\Theta_z$ represent the angles between the incident light beams and the normal vectors of those three planar light receivers 14x, 14y, and 14z. Eq. (3) shows that the orientation of the light source can be determined by comparing the ratios of the light densities determined by planar light detectors facing different directions. Although we use a Cartesian coordinate in our example, Eq. (3) is true for any kind of coordinates defined by the normal vectors of the planar light receivers. It is to be understood that the light receiving surfaces of the present invention do not need to be perpendicular to one another; they can face any arbitrary directions while Eq. (3) is still true. However, for a Cartesian coordinate we have $\cos\Theta_x:\cos\Theta_y:\cos\Theta_z = X:Y:Z$, which leads to the simple relation that $I_x:I_y:I_z = X:Y:Z$. It is therefore possible to determine the position of the light source in a Cartesian coordinate without using any complex calculation; the data analysis procedure for a Cartesian coordinate is simpler than other types of coordinates.

Figure 3B:
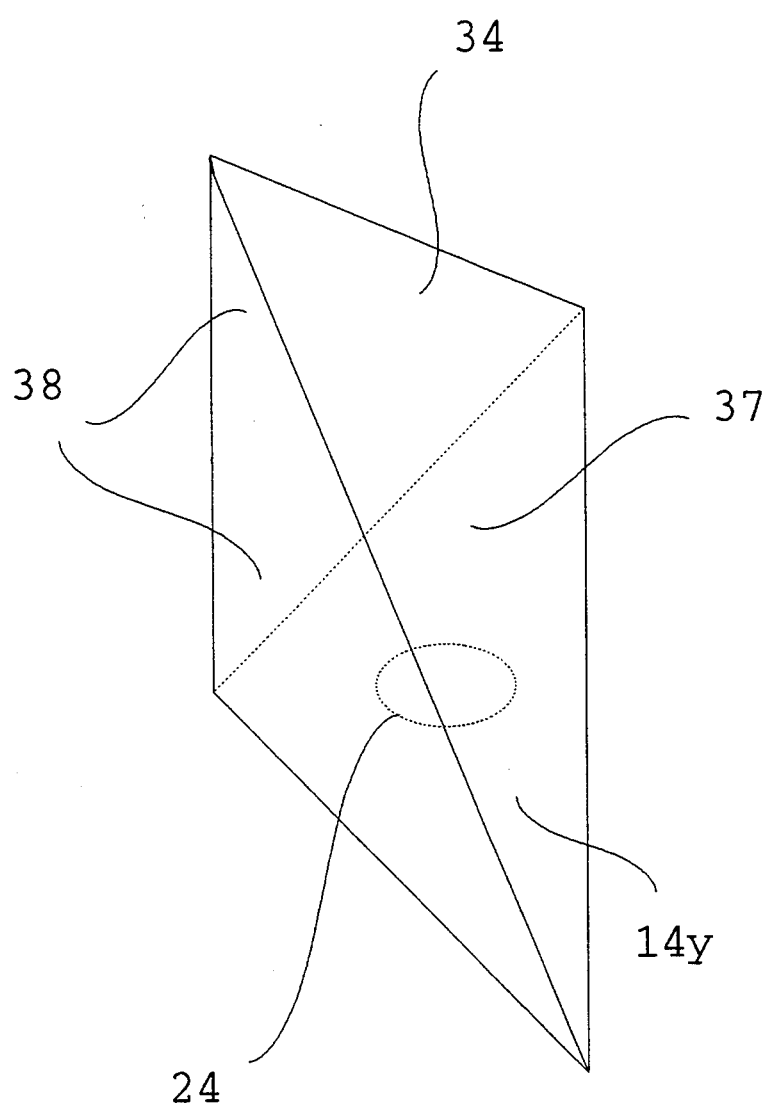

FIGS. 3a and 3b show an alternative way to manufacture a location tracking device. Referring to FIG. 3a, a light collector 30 comprises a pyramid-shaped container. The top surfaces of this pyramid are made of light scattering materials. The volume of the pyramid is divided into three chambers 32, 34, and 36. FIG. 3b shows details of one of the chambers 34. The front surface 14y of the pyramid chamber is a light diffuser. Its two back surfaces 38 are made of light reflecting metal walls. These back surfaces 38 also serve as walls to separate different chambers. A light sensor 24 is placed at the bottom of this pyramid chamber 34. Referring back to FIG. 3a, those three chambers 32, 34, and 36 form a pyramid that fits a corner of a cube as illustrated by the lower left diagram in FIG. 3a. The top surface of each chamber forms a planar light receiver. The light intensities detected by the light sensors 24 at the bottom of those pyramid chambers follow the same relations as described in Eq. (3). This device uses the light diffusers instead of the light sensors to define the light receiving planes. This device is easier to manufacture because all those light sensors can be placed on the same surface. The light sensor also does not need to have a planar receiving surface because the light receiving planes are defined by the diffusers.

Figure 4:
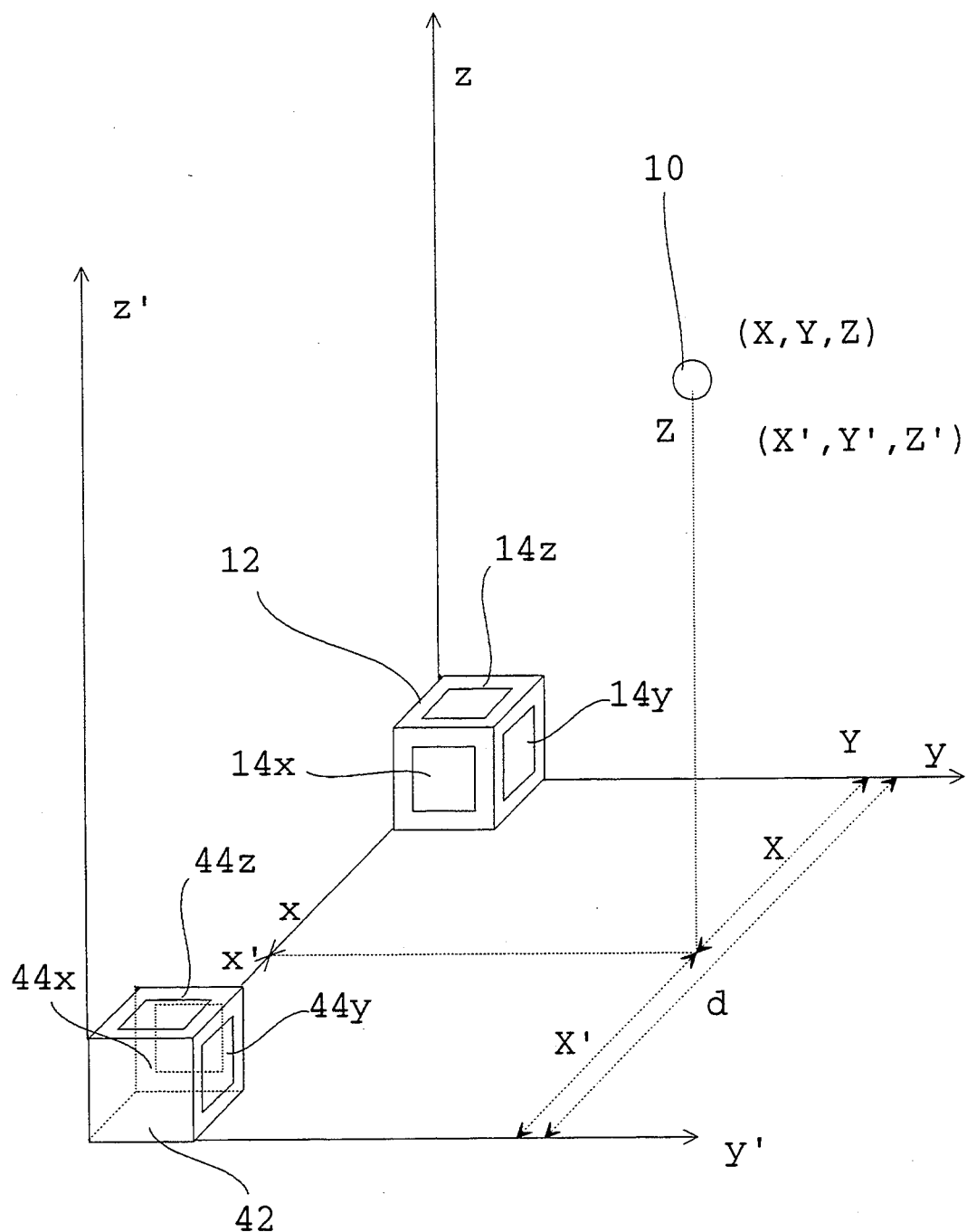
FIG. 4 shows a location tracking system with two devices.

One position tracking device 12 in FIG. 1 can determine the direction of the light source, but we need two devices to know the absolute position of the light source. One simple example of a position tracking system with two devices is illustrated in FIG. 4. The first position tracking device 12 is identical to the one in FIG. 1. The planar light receivers 14x, 14y, and 14z of this device define a Cartesian coordinate as shown in FIG. 4. The second device 42 is placed at a distance d along the x axis defined by the first device 12. The planar light receivers 44x, 44y, and 44z of the second device 42 define another Cartesian coordinate. The position of the light source 10 is (X,Y,Z) in the first coordinate, and is (X',Y',Z') in the second coordinate as illustrated by FIG. 4. From the definition of those two sets of coordinates, we have $$d = X + X' \quad (4)$$

$$Y = Y' \quad (5)$$

$$Z = Z' \quad (6)$$

where d is the distance between those two devices 12 and 42. Using Eqs. (3–6), we have $$X = d/[1 + (I_y/I_x)(I_x'/I_y')] \quad (7)$$

$$Y = d(I_y/I_x)/[1 + (I_y/I_x)(I_x'/I_y')] \quad (8)$$

$$Z = d(I_z/I_x)/[1 + (I_y/I_x)(I_x'/I_y')] \quad (9)$$

where $I_x$, $I_y$, $I_z$, $I_x'$, and $I_y'$ are the light intensities detected by the light receivers 14x, 14y, 14z, 44x, and 44y. Eqs. (7–9) show that three dimensional location of the light source 10 can be determined by a two-device system. In addition, the above equations suggest that we only need 5 sensors instead of 6 sensors. A two-dimensional application will need 4 sensors.

Figure 5:
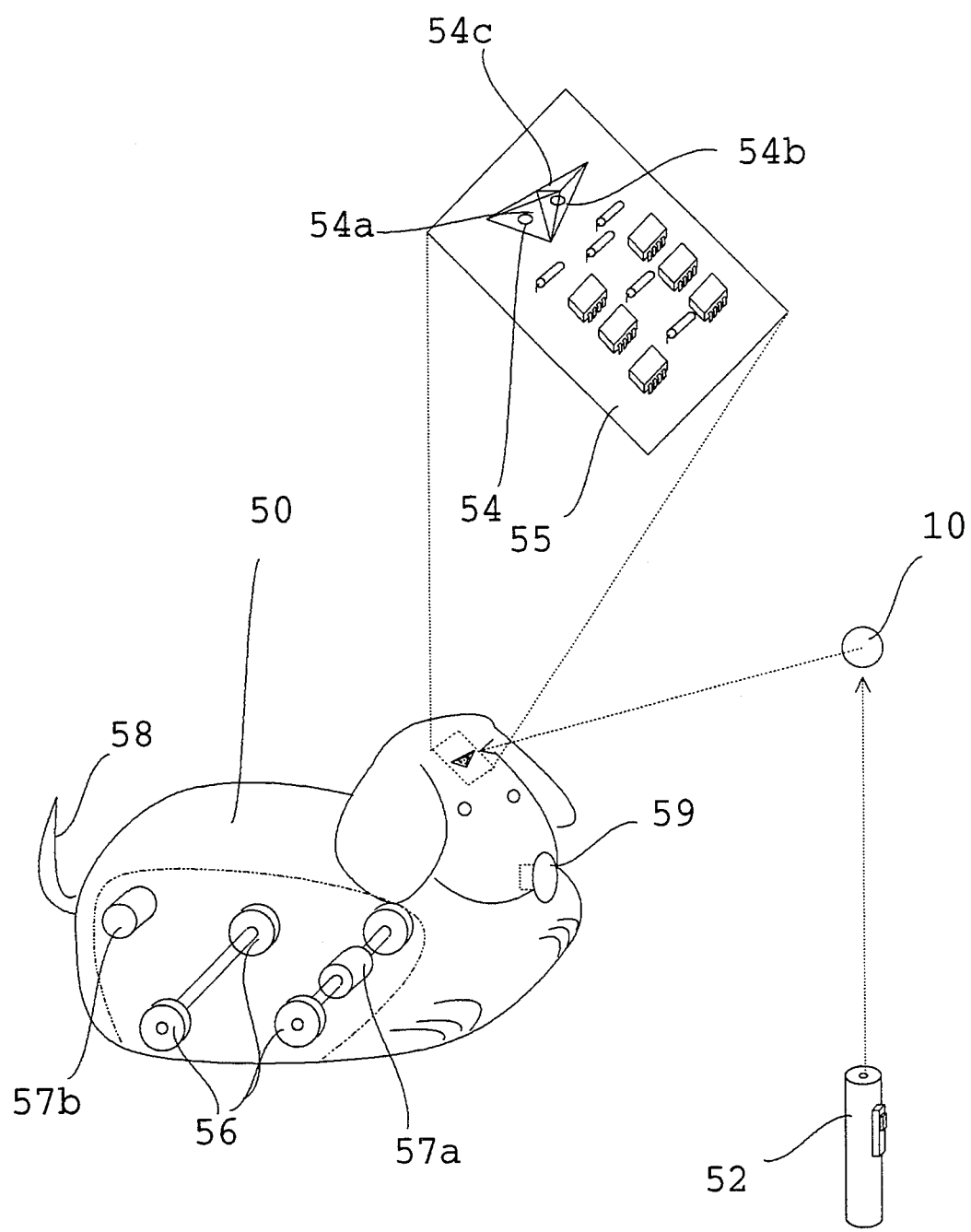
FIG. 5 shows a toy dog using the present invention.

The location tracking devices as set forth herein can be used in a wide variety of applications as illustrated by the following two examples:

FIG. 5 shows an application of the present invention on a toy dog 50. The motion of this toy dog 50 is controlled by a light pen 52. A light beam emitted from the light pen is pointed to an object (not shown in FIG. 5). A light spot 10 forms on the object pointed by the light beam. This light spot 10 is detected by a location tracking device 54 placed at the forehead of the toy dog 50. This location tracking device 54 comprises two light detecting units 54a and 54b. The third surface 54c of the device is made of light blocking materials. The location tracking device is mounted on a circuit board 55 hidden under the artificial skin of the toy dog. This toy dog 50 has 4 wheels 56 hidden in its stomach. The two front wheels are controlled by a motor 57a. Another motor 57b is used to control the tail wagging motion of the tail 58 of the toy dog. A small speaker 59 is hidden in the nose of the toy dog.

Figure 6:
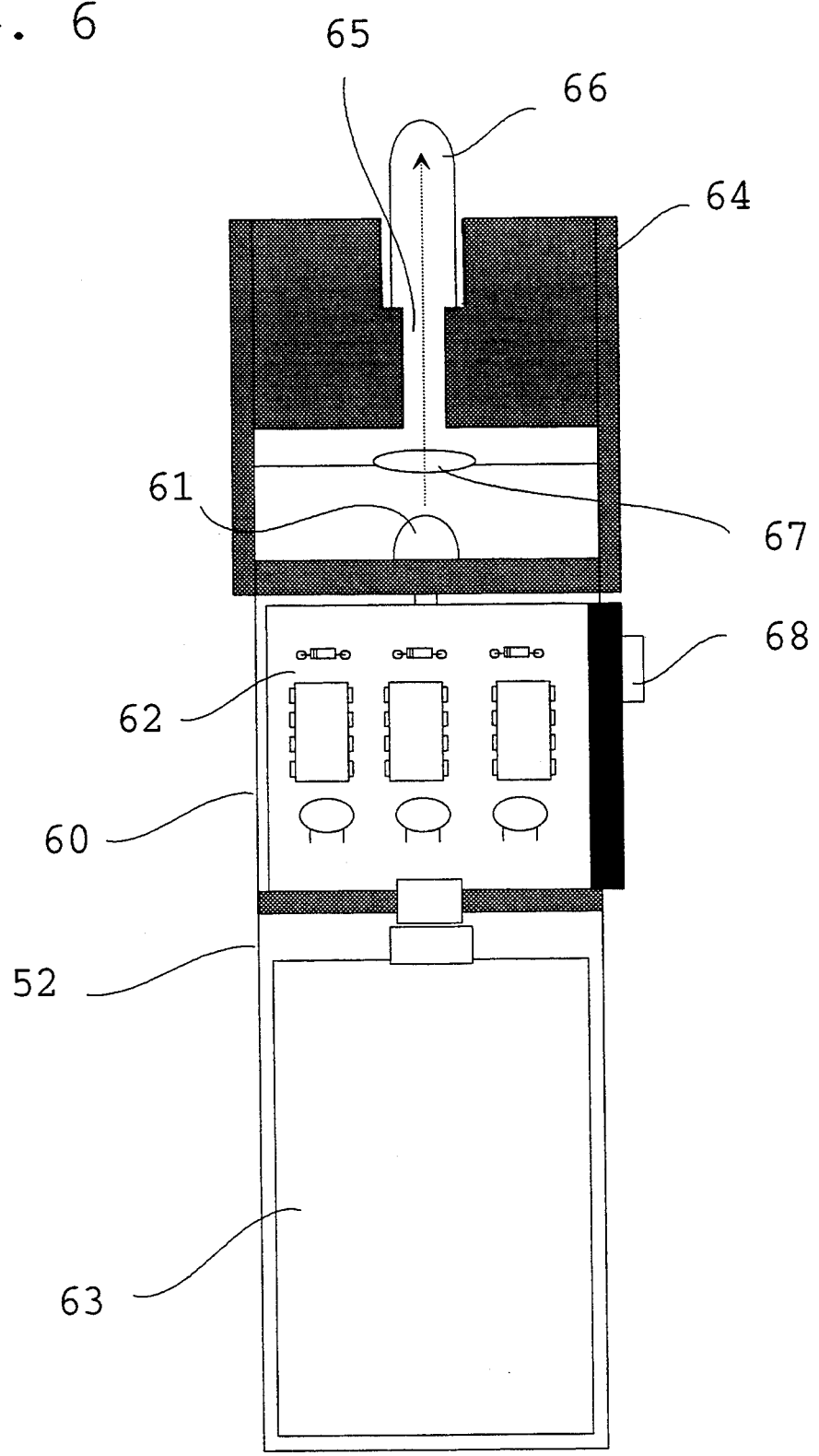
FIG. 6 is a cross-section diagram of the light source in FIG. 5.

FIG. 6 is a cross-section diagram of the light source 52 in FIG. 5. This light source has a cylindrical container 60. A light emitting diode (LED) 61 is placed near the top of the container. This LED 61 is controlled by a circuit board 62. The power of the circuit board is provided by a battery 63. A 3-way switch 68 is placed at one side of the container 60. The top of the container 64 has a pin hole 65. A lens 67 is placed between the LED 61 and the pin hole 65. A removable diffuser cap 66 made of light scattering materials is placed at the output of the pin hole 65. The light emitted by the LED is scattered by the diffuser cap 66 so that a light spot forms at the top of this light source. When the diffuser cap 66 is removed, the light emitted from the LED 61 forms a narrow light beam through the pin hole 65. A light spot will appear on a pointed object when this narrow light beam hits it.

Figure 7:
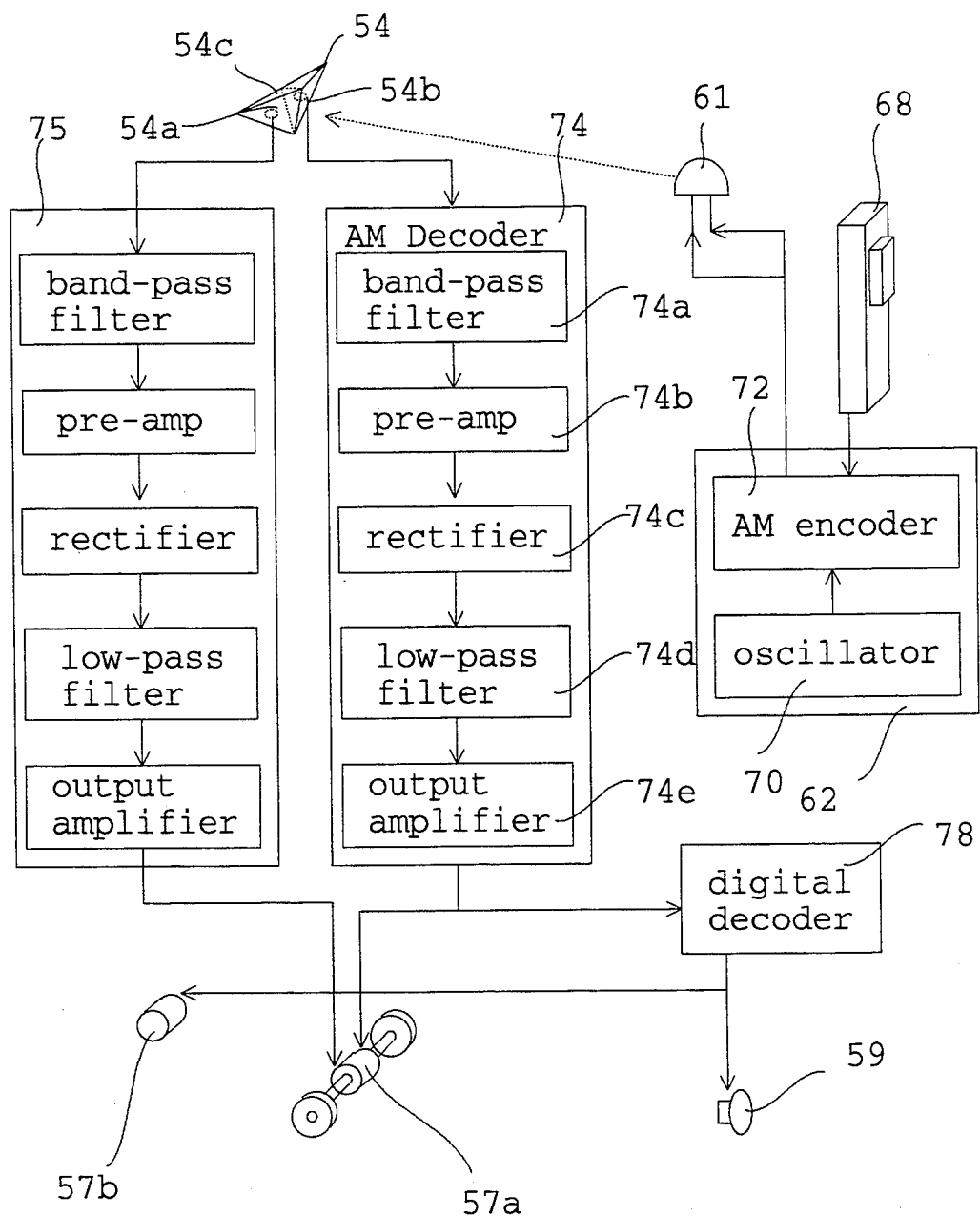
FIG. 7 is a circuit block diagram of the control circuit used by the toy dog in FIG. 5.

FIG. 7 is the circuit block diagram of the control circuits used by the toy dog 50. The circuit board in the light source 62 comprises an oscillator 70 and an amplitude-modulation (AM) encoder 72. The output of the AM encoder 72 controls the light emission of the LED 61. The light emitted from the LED 61 is detected by the location tracking device 54. This location tracking device 54 comprises a left detector 54b and a right detector 54a. The light intensity signals detected by the light detectors are sent to two AM decoders 74 and 75. Each AM decoder comprises a band pass filter 74a, a pre amplifier 74b, a rectifier 74c, a low pass filter 74d, and an output amplifier 74e. The outputs of these AM decoders 74 and 75 control the motor 57a of the wheels. One of the output is sent to a digital decoder 78, which controls the speaker 59 and the tail motor 57b of the toy dog.

The oscillator 70 and the AM encoder 72 controls the light emitted from the LED 61 to be an amplitude modulation (AM) signal with a single carrier frequency and a single light color. The three way switch 68 controls the amplitude modulation function. When the 3-way switch 68 is at the upper position, the AM signal is constant. When the switch 68 is at the middle position, the AM signal shows a (110110 . . . ) pattern. When the switch 68 is at the lower position, the LED is off. This light signal is detected by the light sensors 54a and 54b. This circuit uses three methods to improve signal to noise ratio. First, the light detectors use optical filters to screen out background lights that do not have the same color as the light emitted from the LED. Second, the band-pass filter 74a in the AM decoders selects signals of the same carrier frequency as the frequency of the oscillator 70 on the light source 52. Third, the low-pass filter 74d in the AM decoder 74 filters out glitches in the received signals. The function of the AM decoder is to extract the AM signal from the light signals received by light detectors. The principles of the above circuits are well-known to the art of radio receivers. The band pass filter 74a screens out background noise, and passes signals at the carrier frequency. The rectifier 74c and the low-pass filter 74d extract the AM signals. These two AM decoders 74 and 75 are calibrated in such a way that the left front wheel and the right front wheel of the toy dog will have the same rotation speed when the light spot 10 is placed directly ahead of the toy dog 50. When the left detector 54b receives stronger light signals, the right front wheel of the toy dog will rotate faster than the left front wheel and vice versus. The toy dog will always move toward the direction of the light spot 10 due to this feedback mechanism. When the toy dog is very close to the target light spot, the light is blocked by the top plane 54c of the location tracking device 54, and the motion of the toy dog will stop. The AM signal also contains control information. The output of one of the decoders 74 is sent to a digital decoder 78, which converts the analog AM signal into a series of digital signals. The output of the digital decoder 78 controls the speaker 59 and the tail motor 57b on the toy dog 50. If the light signal is a (110110 . . . ) series digital signal, the toy dog will approach the light spot barking fiercely. If the light signal shows a smooth amplitude, the toy dog will approach the light source barking friendly with its tail wagging.

Figure 8A:
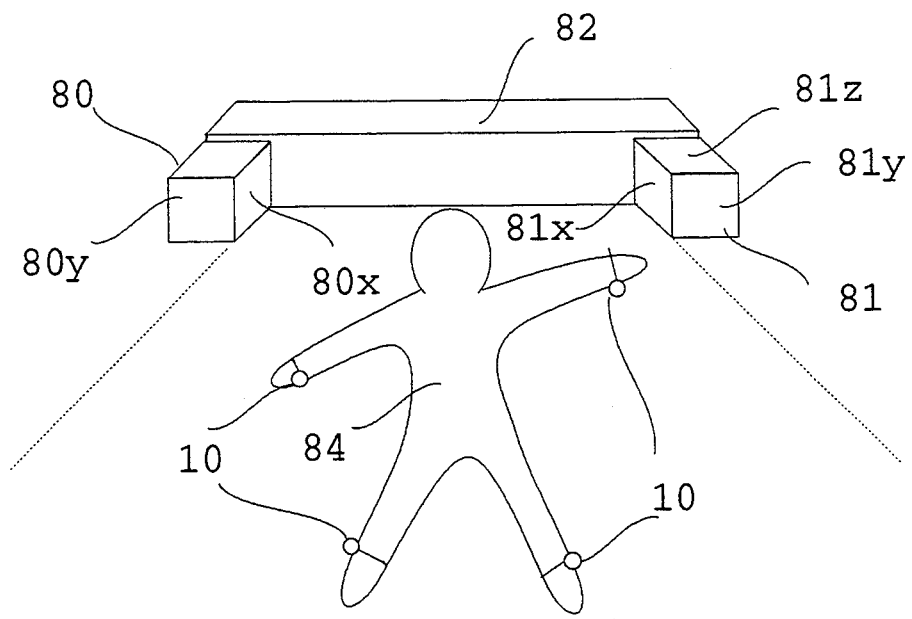
FIGS. 8a and 8b show a video game interactive input system using the present invention.
Figure 8B:
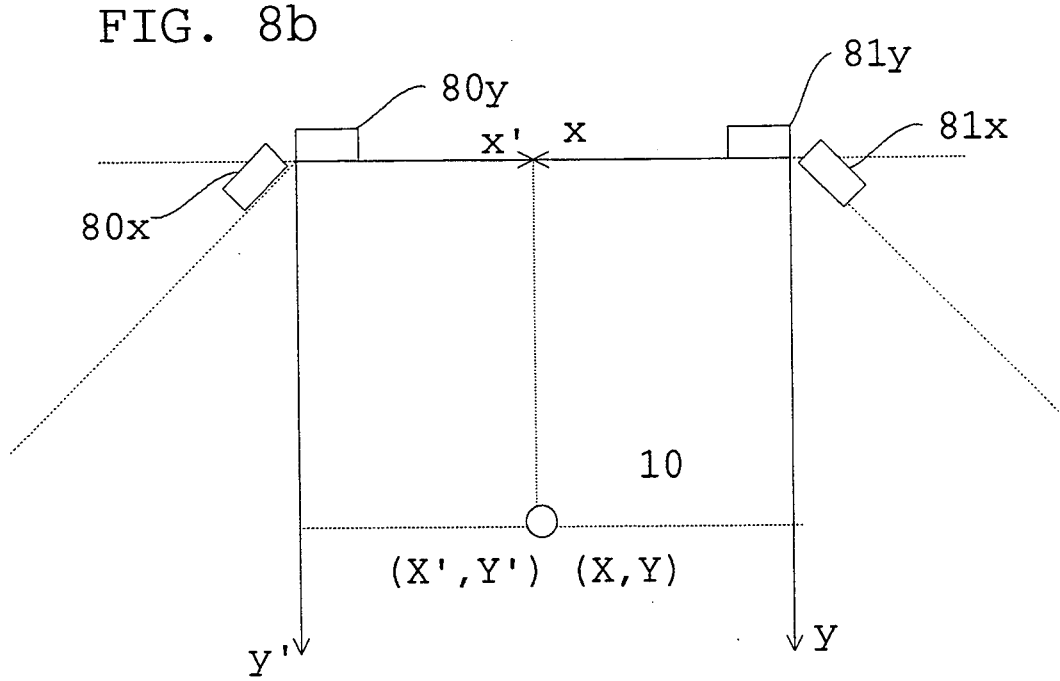

The above example of a toy dog represents a low-cost application of the present invention. It does not require accurate measurement of the light intensity. Although the present invention can be manufactured with low cost, it also can be used for high precision applications as illustrated by the following example:

FIG. 8a shows an application of a video game interactive input system 82 that is capable of determining locations of many light sources accurately. Two sets of location tracking devices 80 and 81 are placed at the ends of the system. A video game player 84 wears 4 light sources 10 on his arms and legs. One of the optical location tracking device 81 comprises three planar light receivers 81x, 81y, and 81z. The planar light receiver in the front 81y faces the y direction of a Cartesian coordinate. Another light receiver 81z faces the z direction. The third receiver 81x faces an angle 45 degree to the x and y axis as shown in the top view of the system in FIG. 8b. The other location tracking device 80 contains a front receiver 80y facing the y' direction, and a side receiver 80x facing a direction 45 degree to the x' position. The receivers 80x and 81x are tilted by 45 degrees so that this system can have wider range. For simplicity, we only show one light source 10 in FIG. 8b. The coordinate of the light source 10 is (X,Y,Z) in the first coordinate, and is (X',Y',Z') in the second coordinate. From the definition of those two sets of coordinates, we have $$d = X + X' \qquad (10)$$

$$Y = Y' \qquad (11)$$

where d is the distance between the two location tracking devices 80 and 81. From Eq. (3) we have $$I_x : I_y : I_z = \cos\Theta_x : \cos\Theta_y : \cos\Theta_z = (X+Y)/1.414 : Y : Z \qquad (12)$$

and $$I_{x'} : I_{y'} = \cos\Theta_{x'} : \cos\Theta_{y'} = (X'+Y)/1.414 : Y \qquad (13)$$

where $I_x$, $I_y$, $I_z$, $I_{x'}$, and $I_{y'}$ represent the light intensities detected by planar light receivers 81x, 81y, 81z, 80x', and 80y'; $\Theta_x$, $\Theta_y$, $\Theta_z$, $\Theta_{x'}$, and $\Theta_{y'}$ represent the angles between the light beams and the normal vectors of those planar light receivers 81x, 81y, 81z, 80x, and 80y. If we define $J_x$ and $J_{x'}$ as $$J_x = (1.414\, I_x - I_y) \qquad (14)$$

$$J_x' = (1.414\, I_x' - I_y') \tag{15}$$

from Eqs. (12–15) we have $$J_x:J_y:J_z = X:Y:Z \tag{16}$$

$$J_x':I_y' = X':Y' \tag{17}$$

$$X = d/[1 + (I_y/J_x)(J_x'/I_y')] \tag{18}$$

$$Y = d(I_y/J_x)/[1 + (I_y/J_x)(J_x'/I_y')] \tag{19}$$

$$Z = d(I_z/J_x)/[1 + (I_y/J_x)(J_x'/I_y')] \tag{20}$$

The three dimensional coordinates of each light source can be determined by Eqs. (14–20).

Figure 9:
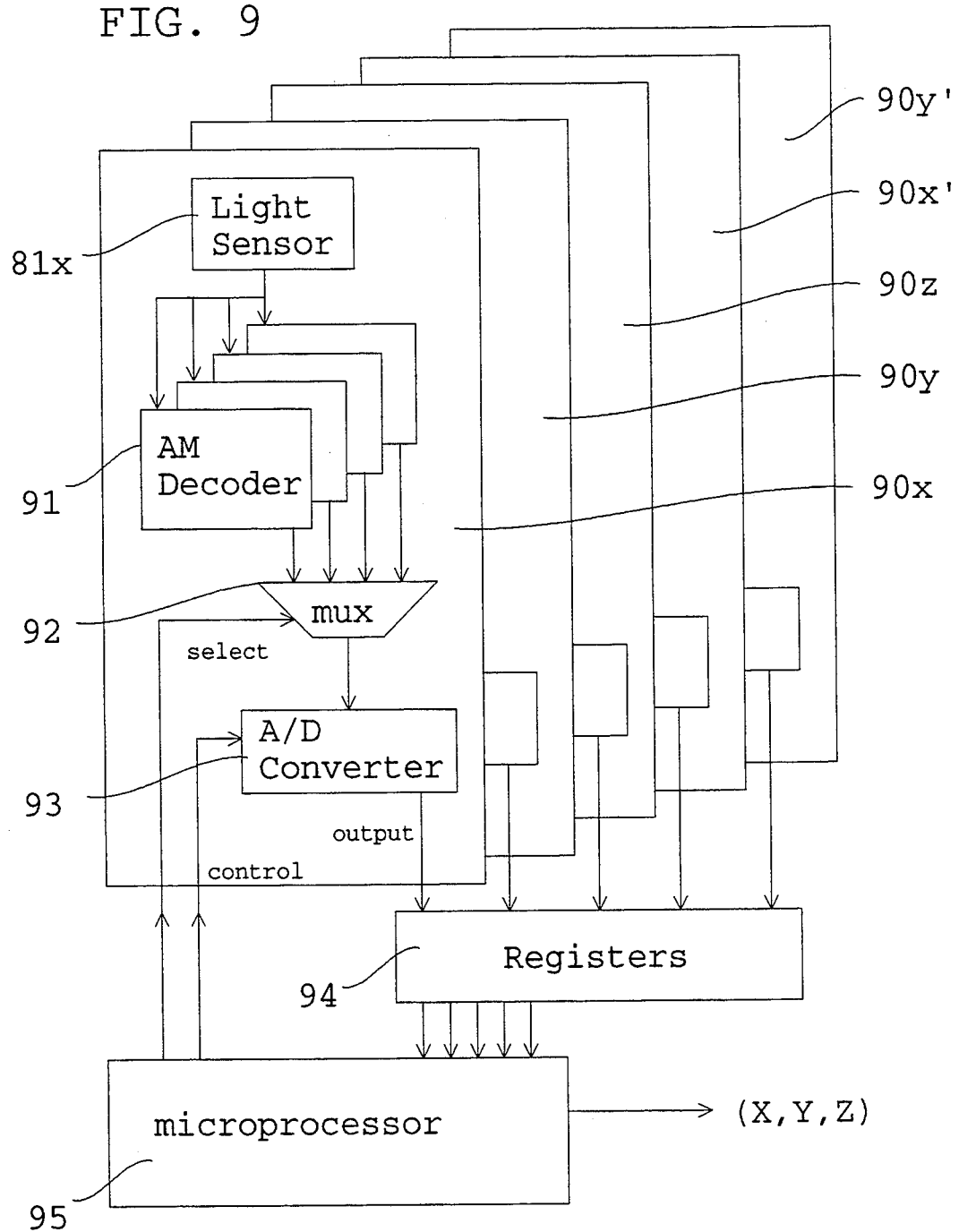
FIG. 9 shows the control circuits of the system in FIG. 8.

FIG. 9 shows the control circuits of the system described in FIG. 8. The outputs of the light sensors are connected to sensor output analyzers 90x, 90y, 90z, 90x', and 90y'. Each light sensor 81x is connected to four AM decoders 91 that is identical to the AM decoders in FIG. 7. The outputs of the AM decoders are connected to a 4-to-1 multiplexer 92. An analog-to-digital (A/D) converter 93 converts the output of the multiplexer 92 into digital values. The digital outputs of each analyzer are stored in registers 94. A microprocessor 95 controls the operation of all those multiplexers 92 and those A/D converters 93. This microprocessor also reads data from the registers 94, and uses Eqs. (14–20) to calculate the locations of each light source 10. Each light source emits signals of different carrier frequencies. The band path filters in the AM decoders 91 select signals emitted by each individual light source so that one location tracking system can determine the locations of multiple light sources. The circuits described in FIG. 9 can detect up to 4 light sources. This system is capable of tracking many more light sources if we add more AM decoders to the system.

The present invention has been described with reference to particular examples of a toy dog and a multi-user video game input system. It is to be understood that variations and modifications can be made within the spirit and scope of the invention by those skilled in the art. Such changes and modifications are to be understood as included within the scope of the present invention as defined by the appended claims.

What is claimed is:

1. An optical location tracking device comprises one or more light sources and two or more light detectors; said light detector comprises a light receiving plane and a light sensor; the output of said light sensor is dependent on the incident angle of the light beams reaching said light receiving plane; the location of said light sources are determined by the outputs of said light sensors from said angular dependence of said light detector.

2. The light detector as set forth in claim 1 comprises a light diffuser; said light diffuser scatters incident light beams to simplify the angular dependence of said light detector.

3. The light detector as set forth in claim 1 comprises two or more chambers; said chamber comprises a light scattering surface and a light sensor; said light scattering surface determines the angular dependence of the light intensity detected by said light sensor.

4. The light source as set forth in claim 1 comprises a removable light scattering cap; said light source becomes a pointer when said light scattering cap is removed.

5. A toy dog uses the optical location tracking device as set forth in claim 1.

6. A video game input system uses the optical location tracking device as set forth in claim 1.

* * * * *